United States Patent
Lee

(10) Patent No.: US 8,383,428 B2
(45) Date of Patent: Feb. 26, 2013

(54) EXHAUST PRESSURE DETECTOR

(75) Inventor: Seung Yong Lee, Osan-si (KR)

(73) Assignee: J-Solution Co., Ltd., Hwaseong-si, Gyeonggi-do (KR)

( * ) Notice: Subject to any disclaimer, the term of this patent is extended or adjusted under 35 U.S.C. 154(b) by 98 days.

(21) Appl. No.: 13/087,973

(22) Filed: Apr. 15, 2011

(65) Prior Publication Data

US 2012/0260724 A1    Oct. 18, 2012

(51) Int. Cl.
*H01L 21/00* (2006.01)

(52) U.S. Cl. ............................................... 438/5

(58) Field of Classification Search ................ 73/114.76
See application file for complete search history.

(56) References Cited

U.S. PATENT DOCUMENTS

| | | | |
|---|---|---|---|
| 5,851,293 A * | 12/1998 | Lane et al. | 118/715 |
| 7,553,356 B2 * | 6/2009 | Rikihisa | 96/271 |
| 7,682,987 B2 * | 3/2010 | Yuasa et al. | 438/765 |
| 7,695,700 B2 * | 4/2010 | Holst et al. | 423/210 |
| 7,758,818 B2 * | 7/2010 | Lee et al. | 422/168 |
| 8,003,411 B2 * | 8/2011 | Yuasa et al. | 438/5 |
| 8,178,428 B2 * | 5/2012 | Noda et al. | 438/488 |
| 8,211,798 B2 * | 7/2012 | Ozaki et al. | 438/680 |
| 2008/0160905 A1 | 7/2008 | Kim et al. | |
| 2011/0220023 A1 * | 9/2011 | Lee | 118/715 |

* cited by examiner

*Primary Examiner* — Freddie Kirkland, III
(74) *Attorney, Agent, or Firm* — Sherr & Jiang, PLLC

(57) ABSTRACT

An exhaust pressure measuring device including a connection pipe connected to a middle of an exhaust line for carrying byproduct gas, the connection pipe having an opening formed in a middle of a body thereof; a chamber provided at an outer side of the connection pipe and communicating with an inside of the connection pipe through the opening, the chamber having a nitrogen supply line connected thereto, the nitrogen supply line allowing nitrogen gas to be supplied from the outside; and a pressure sensor installed to the chamber to measure pressure in the chamber, whereby a change of exhaust pressure in the exhaust line is measured from the measured pressure in the chamber.

7 Claims, 6 Drawing Sheets

*-Prior Art-*

EXHAUST PRESSURE DETECTOR

BACKGROUND OF THE INVENTION

1. Field of the Invention

The present invention relates to an exhaust pressure measuring device, and more particularly, to an exhaust pressure measuring device that allows measurement of a change of pressure in an exhaust line in order to prevent problems caused by clogging of an exhaust line at a outletside of a dry pump and at an inletside of a scrubber, and an exhaust line at a outletside of the scrubber in a semiconductor or LCD apparatus in advance.

2. Description of the Related Art

Generally, a semiconductor manufacturing process includes a fabrication process and a assembly and test process. The pre-process means a process for manufacturing semiconductor chips by depositing thin films on a wafer in various process chambers and selectively etching the deposited films in a repeated way to form a predetermined pattern. The post-process means a process of individually separating the chips manufactured in the pre-process and then coupling the individual chip to a lead frame to assemble a final product.

At this time, the process of depositing thin films on a wafer or etching the films deposited on the wafer is performed at high temperature by using harmful gases such as silane, arsine, and boron chloride and process gases such as hydrogen in a process chamber. While such a process is performed, a large amount of various pyrophoric gases and byproduct gas containing harmful components and corrosive impurities are generated in the process chamber.

Thus, a semiconductor manufacturing apparatus is provided with a scrubber 15, which purifies byproduct gas discharged from a process chamber 11 and discharges the purified byproduct gas to the atmosphere, at a outletside of a vacuum pump for making the process chamber into a vacuous state, as shown in FIG. 1.

However, the harmful byproduct gas generated from the process chamber 11 is easily solidified and accumulated while flowing along an outlet-side exhaust line of the process chamber 11, an outlet-side exhaust line 14a of a dry pump 12, an outlet-side exhaust line 14b of a scrubber 13, and a main duct 15 in order, thereby resulting in clogging.

Thus, in order to prevent the clogging caused by the solidified byproduct gas, various techniques for keeping the exhaust line in a worm state have been developed. For example, a jacket heater is commonly used for entirely surrounding a certain region of an exhaust line so that the inside of the exhaust line is kept worm. Also, a method for supplying high-temperature nitrogen into an exhaust line is well known in the art.

However, although various methods have been attempted to prevent byproduct gas from being solidified and clogging the exhaust line, the byproduct gas flowing in an exhaust line is often solidified during a semiconductor manufacturing process to clog the exhaust line. This accident occurs when workers do not expect it at all, thereby causing serious damages inevitably.

SUMMARY OF THE INVENTION

The present invention is conceived to solve the aforementioned problems in the prior art. An object of the present invention is to provide an exhaust pressure measuring device, which allows measurement of a change of pressure in order to prevent unexpected problems by checking clogging of an exhaust line at a outletside of a dry pump and at an inletside of a scrubber, and an exhaust line at a outletside of the scrubber in a semiconductor or LCD apparatus in an initial stage.

According to an aspect of the present invention for achieving the objects, there is provided an exhaust pressure measuring device, which includes a connection pipe connected to a middle of an exhaust line for carrying byproduct gas, the connection pipe having an opening formed in a middle of a body thereof; a chamber provided at an outer side of the connection pipe and communicating with an inside of the connection pipe through the opening, the chamber having a nitrogen supply line connected thereto, the nitrogen supply line allowing nitrogen gas to be supplied from the outside; and a pressure sensor installed to the chamber to measure pressure in the chamber, whereby a change of exhaust pressure in the exhaust line is measured from the measured pressure in the chamber.

Here, the chamber may be supplied with high-temperature nitrogen gas.

Also, the opening may be formed to be directed forward in an inner peripheral surface of the body of the connection pipe, whereby nitrogen gas is introduced in the same direction as a flowing direction of the byproduct gas.

In addition, a guide blade may be provided along the inner peripheral surface of the body of the connection pipe so that the opening is formed to be directed forward in the inner peripheral surface of the body of the connection pipe, and the guide blade may have a rear side portion with a streamlined surface, which gradually protrudes from the inner peripheral surface of the body of the connection pipe to prevent abrupt collision with a byproduct.

Also, the opening of the connection pipe may be formed along a circumferential direction of the body, and the chamber may be formed along the opening on an outer peripheral surface of the body of the connection pipe.

In addition, a nitrogen gas injection module for supplying high-temperature nitrogen gas into the connection pipe to prevent a byproduct from being solidified may be further installed to the connection pipe.

Also, the nitrogen gas injection module may include an injection nozzle installed in the shape of a ring at a middle of the body of the connection pipe in a circumferential direction to supply high-temperature nitrogen gas into the connection pipe, the injection nozzle having an inner hollow formed in a circumferential direction for the movement of nitrogen gas supplied from the outside, the injection nozzle having an injection opening opened forward along a circumferential direction in the inner peripheral surface of the body of the connection pipe along the hollow.

The exhaust pressure measuring device according to the present invention can measure a change of pressure in an exhaust line so that problems caused by clogging of an exhaust line at inlet and outletsides of a scrubber in a semiconductor or LCD apparatus may be prevented in advance.

Also, according to the present invention, a chamber is additionally provided to install a pressure sensor so that the pressure sensor does not disturb a flow of a byproduct.

In addition, since nitrogen is allowed to flow via the chamber to which the pressure sensor is installed according to the present invention, a change of exhaust pressure can be measured in a faster and more accurate way due to more sensitive response to a change of pressure in the exhaust line.

Further, in a case where a nitrogen gas supply module is further included in the present invention, there is no need to additionally install a high-temperature nitrogen gas supply device for preventing a byproduct from being solidified.

DESCRIPTION OF THE PREFERRED EMBODIMENT

Hereinafter, preferred embodiments according to the aforementioned technical spirit of the present invention will be described in detail with reference to the accompanying drawings.

Figure 1:
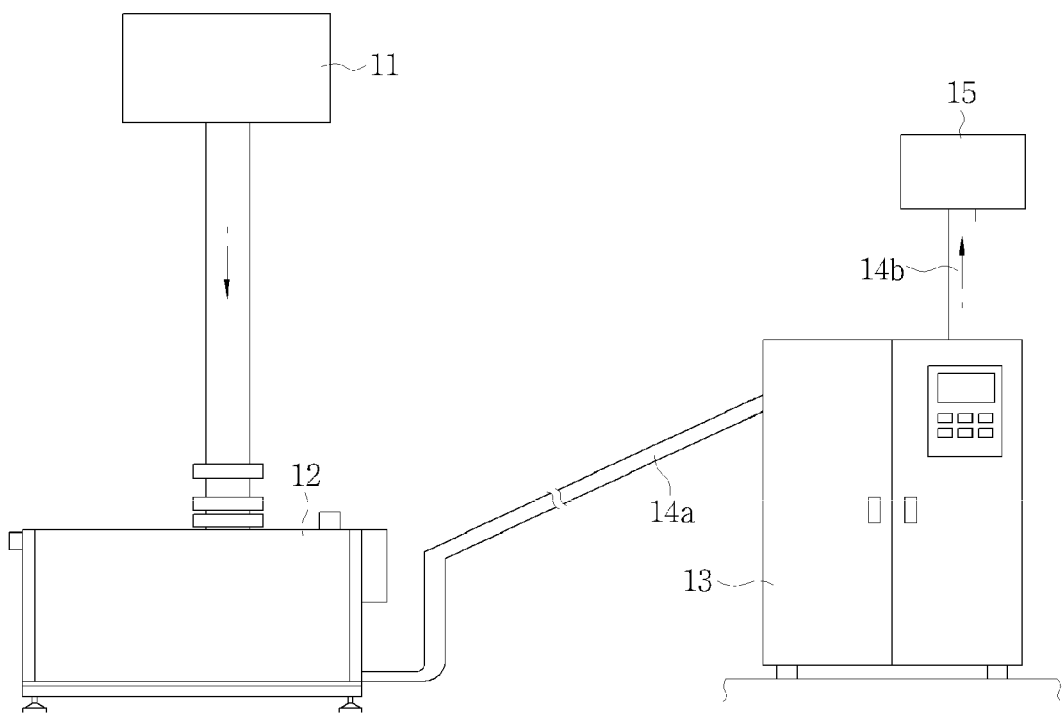
FIG. 1 is a view illustrating a conventional exhaust gas measuring device.
Figure 2:
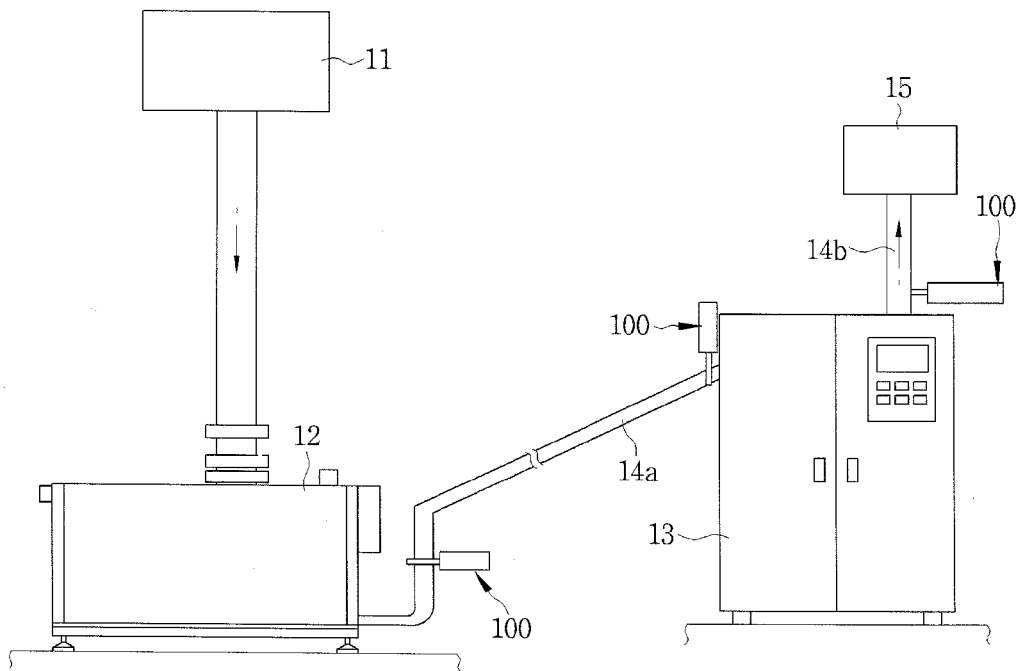
FIG. 2 is a view showing an installed state of an exhaust pressure measuring device according to the present invention.

FIG. 2 is a view showing an installed state of an exhaust pressure measuring device according to the present invention.

As shown in the figure, exhaust pressure measuring devices 100 according to the present invention are respectively installed to an exhaust line 14a at a outletside of a dry pump 12 and at an inletside of a scrubber 13, and to an exhaust line 14b at a outletside of the scrubber 13 connected to a main duct 15.

The portions where the exhaust pressure measuring devices are installed may cause serious problems since a byproduct generated from a process chamber 11 and flowing in the exhaust lines is solidified and then the exhaust lines are frequently clogged with the solidified byproduct.

However, if the exhaust pressure measuring devices 100 according to the present invention are installed to the exhaust line at the outletside of the dry pump 12 and at the inletside of the scrubber 13, and to the exhaust line at the outletside of the scrubber 13, which may be dangerous portions, clogging caused by a byproduct can be recognized in advance, and thus it is possible to find serious problems caused by clogging in advance and thus take necessary measures.

Hereinafter, the configuration of the present invention will be described in detail.

Figure 3:
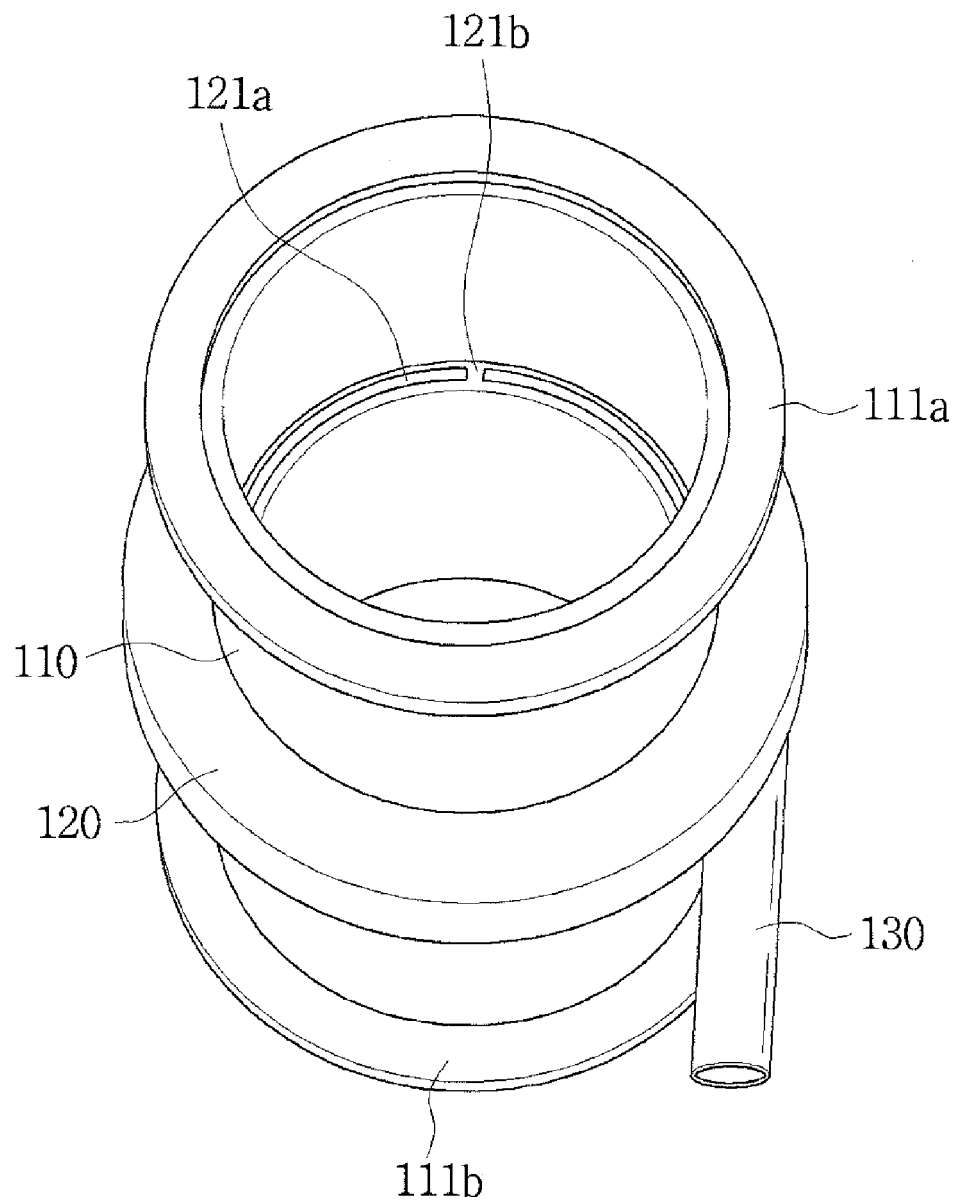
FIG. 3 is a perspective view of the exhaust pressure measuring device according to the present invention.
Figure 4:
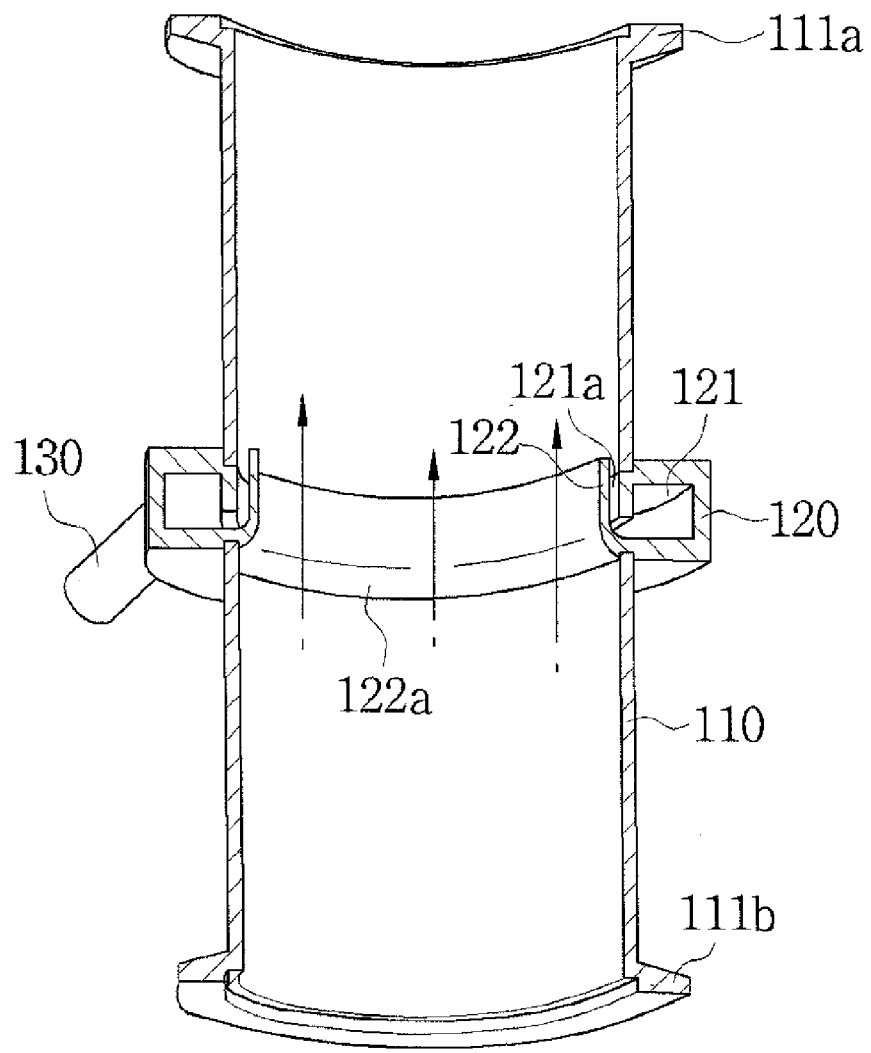
FIGS. 4 and 5 are longitudinal sectional views illustrating the configuration of the exhaust pressure measuring device according to the present invention.
Figure 5:
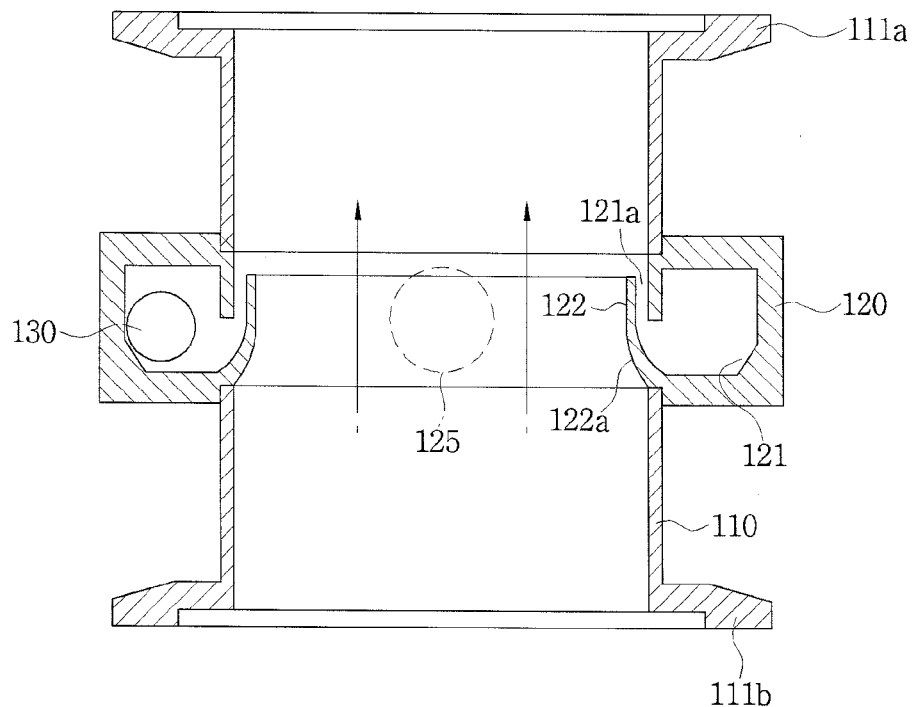

FIG. 3 is a perspective view of the exhaust pressure measuring device according to the present invention, and FIGS. 4 and 5 are longitudinal sectional views illustrating the configuration of the exhaust pressure measuring device according to the present invention.

As shown in the figures, the exhaust pressure measuring device according to the present invention includes a connection pipe 110 for connecting to an exhaust line, a chamber member 120 for providing a chamber 121 to allow exhaust pressure to be measured while supplying nitrogen to the connection pipe 110, and a pressure sensor 130 for measuring pressure in the chamber 121. Hereinafter, the exhaust pressure measuring device according to the present invention will be described based on each of the aforementioned components.

The connection pipe 110 has a tubular body for the connection to an exhaust line that carries byproduct gas, and is provided with flanges 111a and 111b at front and rear sides of the body, respectively. Also, an opening 121a is formed in the middle of the body of the connection pipe 110.

The opening 121a is formed along the entire circumference of the body of the connection pipe 110, and spacers 121b are formed intermittently to enable the opening 121a to be defined. Also, the opening 121a is formed to be directed forward from an inner peripheral surface of the body of the connection pipe 110, so that nitrogen gas is introduced in the same direction as a flowing direction of a byproduct. To this end, a guide blade 122 is provided along the inner peripheral surface so that the guide blade 122 is formed to be directed forward from the inner peripheral surface of the body of the connection pipe 110. Hereby, the guide blade guides nitrogen gas introduced from the chamber 121 into the connection pipe 110 to be directed forward from an initial stage of the introduction. Meanwhile, the rear side of the guide blade 122 gradually protrudes from the inner peripheral surface of the body of the connection pipe 110 and is formed to have a surface 122a in the shape of a streamline to thereby prevent abrupt collision with a byproduct flowing in the exhaust line.

The chamber member 120 is installed in the shape of a ring to surround the opening 121a at an outer peripheral surface of the body of the connection pipe 110, and has a chamber 121 communicating with the inside of the connection pipe 110 through the opening 121a. The chamber 121 is connected with a nitrogen supply line 141 and then is supplied with a heated nitrogen gas. The high-temperature nitrogen gas supplied to the chamber 121 is introduced into the connection pipe 110 through the opening 121a. At this time, there is no need to additionally apply pressure for supply of nitrogen gas through the nitrogen supply line 141. This is because if byproduct gas flows in the connection pipe 110, nitrogen gas may be naturally introduced into the connection pipe 110 though the opening 121a from the nitrogen supply line 141 due to a relatively decreased pressure. At this time, the pressure in the chamber where the nitrogen gas flows is decreased due to the flow of nitrogen gas, and thus, the pressure in the chamber 121 becomes similar to the pressure in the connection pipe 110. Accordingly, when a pressure sensor 130 is installed to the chamber 121 to measure pressure in the chamber 121, a change of exhaust pressure caused by a byproduct, which occurs in the connection pipe 110 and the exhaust line, can be accurately measured without disturbing the flow of the byproduct gas.

Here, the reason why the nitrogen gas introduced through the chamber 121 has high temperature is that the opening 121a is prevented from being easily clogged when a large amount of byproduct gas flows in the exhaust gas. Also, the high-temperature nitrogen gas may serve to prevent a byproduct in the exhaust gas from being solidified. However, when a small amount of byproduct gas flows in the exhaust gas, the possibility of clogging the opening 121a by byproduct gas is relatively low, and thus it is not essential to supply high-temperature nitrogen gas.

The pressure sensor 130 is installed within the chamber 121 to measure the pressure in the chamber 121. Hereby, it is possible to measure a change of exhaust pressure in the connection pipe 110. If the pressure in the connection pipe 110 is changed in accordance with a flow rate of byproduct gas in the connection pipe 110, the flow of nitrogen gas introduced via the chamber 121 is also changed, and thus the pressure in the chamber 121 is also changed as a sensitive response thereto, as described above. For example, if the exhaust line where the byproduct gas flows becomes partially clogged due to the solidification of the byproduct gas, the flow rate of the byproduct gas in the exhaust line and the connection pipe 110 is lowered, thereby increasing exhaust pressure. Then, the flow rate of nitrogen gas flowing via the chamber 121 is lowered, and the pressure in the chamber 121 is increased. At this time, the sensitive exhaust pressure in the chamber 121 is measured by the pressure sensor 130, and the exhaust pressure is transmitted to a controller for monitoring.

Here, the pressure sensor 130 may use any product widely used in the art, which can measure pressure of a fluid in a digital or analog manner, and it may be suitably selected from known products available in the market.

Figure 6:
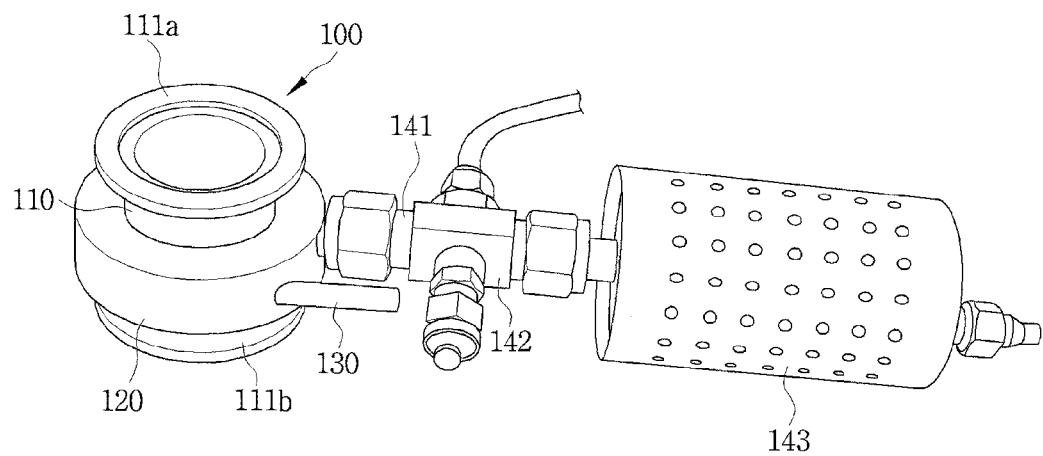
FIG. 6 is a view showing that a nitrogen supply line is connected to the exhaust pressure measuring device according to the present invention.

FIG. 6 is a view showing that a nitrogen supply line is connected to the exhaust pressure measuring device according to the present invention.

As shown in the figure, the nitrogen supply line 141 is connected to the exhaust pressure measuring device 100 of the present invention to introduce high-temperature nitrogen gas thereto. Here, the nitrogen supply line 141 is connected to a connection hole 125 provided in the chamber member 120. Also, a heater 143 for heating the supplied nitrogen gas and a valve 142 for controlling a supplied amount of nitrogen gas are preferably installed to the nitrogen supply line 141.

Now, the operation of the exhaust pressure measuring device according to the present invention so configured will be described in detail with reference to the accompanying drawings.

First, if byproduct gas flows in the exhaust line to which the exhaust pressure measuring device of the present invention is installed, the pressure in the exhaust line and the pressure in the connection pipe 110 connected to the exhaust line are lowered rather than an external pressure, so that a heated nitrogen gas is naturally introduced into the connection pipe 110 from the nitrogen supply line 141 via the chamber 121 and the opening 121a. Hereby, a change of the exhaust pressure caused by the flow of the byproduct gas in the exhaust line is reflected to the inside of the chamber 121 at which the pressure sensor 130 is installed.

Thereafter, if the byproduct gas is partially solidified to start clogging the exhaust line so that the flow rate of the byproduct flowing in the exhaust line is lowered, the exhaust pressure in the exhaust line and the connection pipe 110 is increased. Accordingly, the supplying rate of nitrogen gas supplied from the nitrogen supply line 141 is lowered. Thus, the pressure in the chamber 121 to which the pressure sensor 130 is installed is increased rather than a previous state, and the pressure sensor 130 measures the changed pressure.

Then, the pressure sensor 130 transmits a signal corresponding to the measured pressure to a controller so that the controller displays the signal. Then, a worker may find clogging of the exhaust line caused by solidification in an early stage and take appropriate measures.

Meanwhile, the exhaust pressure measuring device according to the present invention may further have a function of supplying high-temperature nitrogen that is necessary for preventing solidification of a byproduct. Hereinafter, this modification with such a feature will be described.

Figure 7:
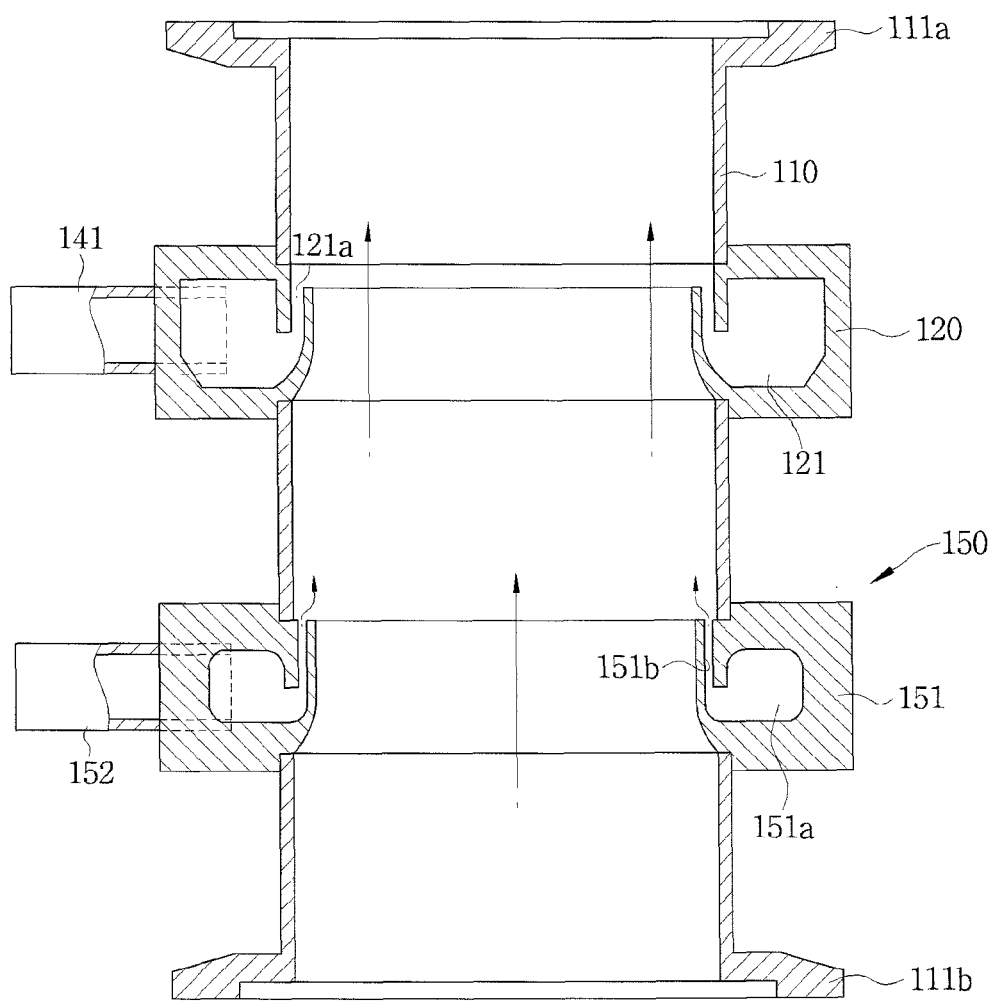
FIG. 7 is a view illustrating an exhaust pressure measuring device according to a modification of the present invention.

FIG. 7 is a view illustrating an exhaust pressure measuring device according to a modification of the present invention.

As shown in the figure, the modification is further provided with a nitrogen gas injection module 150 for supplying high-temperature nitrogen to the connection pipe 110.

The injection module 150 has an injection nozzle 151 installed in the shape of a ring along the body of the connection pipe 110 to supply heated nitrogen gas into the connection pipe 110. Here, the injection nozzle 151 basically has an inner hollow 151a formed in a circumferential direction for the movement of nitrogen gas supplied from the outside, and an injection opening 151b opened to the front along a circumferential direction in the inner peripheral surface of the body of the connection pipe 110 is formed along the inner hollow 151a. The injection opening 151b is formed over the entire inner peripheral surface of the body of the connection pipe 110 and has a structure similar to the opening 121a formed for the introduction of nitrogen gas from the chamber 121.

Meanwhile, the high-temperature nitrogen supply line 152 is connected to the injection nozzle 151.

In general, a device for supplying high-temperature nitrogen gas to the exhaust line should be essentially installed in order to prevent a byproduct from being solidified. If the exhaust pressure measuring device of the present invention further comprises the nitrogen gas injection module 150, there is an advantage in that an additional device for supplying nitrogen gas and an installation process thereof may be excluded.

Although the preferred embodiments of the present invention have been described, the present invention may use various changes, modifications and equivalents. It will be apparent that the present invention may be equivalently applied by appropriately modifying the aforementioned embodiments. Accordingly, the above descriptions do not limit the scope of the present invention defined by the appended claims.

What is claimed is:

1. An exhaust pressure measuring device, comprising:
   a connection pipe connected to a middle of an exhaust line for carrying byproduct gas, the connection pipe having an opening formed in a middle of a body thereof;
   a chamber provided at an outer side of the connection pipe and communicating with an inside of the connection pipe through the opening, the chamber having a nitrogen supply line connected thereto, the nitrogen supply line allowing nitrogen gas to be supplied from the outside; and
   a pressure sensor installed to the chamber to measure pressure in the chamber, whereby a change of exhaust pressure in the exhaust line is measured from the measured pressure in the chamber.

2. The exhaust pressure measuring device according to claim 1, wherein the chamber is supplied with high-temperature nitrogen gas.

3. The exhaust pressure measuring device according to claim 1, wherein the opening is formed to be directed forward in an inner peripheral surface of the body of the connection pipe, whereby nitrogen gas is introduced in the same direction as a flowing direction of the byproduct gas.

4. The exhaust pressure measuring device according to claim 3, wherein a guide blade is provided along the inner peripheral surface of the body of the connection pipe so that the opening is formed to be directed forward in the inner peripheral surface of the body of the connection pipe, and the guide blade has a rear side portion with a streamlined surface, which gradually protrudes from the inner peripheral surface of the body of the connection pipe to prevent abrupt collision with a byproduct.

5. The exhaust pressure measuring device according to claim 1, wherein the opening of the connection pipe is formed along a circumferential direction of the body, and the chamber is formed along the opening on an outer peripheral surface of the body of the connection pipe.

6. The exhaust pressure measuring device according to claim 1, wherein a nitrogen gas injection module for supplying high-temperature nitrogen gas into the connection pipe to prevent a byproduct from being solidified is further installed to the connection pipe.

7. The exhaust pressure measuring device according to claim 6, wherein the nitrogen gas injection module comprises an injection nozzle installed in the shape of a ring at a middle of the body of the connection pipe in a circumferential direction to supply high-temperature nitrogen gas into the connection pipe, the injection nozzle having an inner hollow formed in a circumferential direction for the movement of nitrogen gas supplied from the outside, the injection nozzle having an injection opening opened forward along a circumferential direction in the inner peripheral surface of the body of the connection pipe along the hollow.

* * * * *